United States Patent
Younes et al.

(10) Patent No.: US 11,577,222 B2
(45) Date of Patent: Feb. 14, 2023

(54) CARBON DIOXIDE CAPTURE

(71) Applicant: Saudi Arabian Oil Company, Dhahran (SA)

(72) Inventors: Mourad Younes, Dhahran (SA); Aqil Jamal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 227 days.

(21) Appl. No.: 17/140,258

(22) Filed: Jan. 4, 2021

(65) Prior Publication Data

US 2022/0212168 A1 Jul. 7, 2022

(51) Int. Cl.
| | |
|---|---|
| *B01D 69/14* | (2006.01) |
| *B01D 53/04* | (2006.01) |
| *B01D 53/10* | (2006.01) |
| *B01J 20/28* | (2006.01) |
| *B01J 20/26* | (2006.01) |
| *B01J 20/34* | (2006.01) |

(52) U.S. Cl.
CPC ...... *B01J 20/2805* (2013.01); *B01D 53/0438* (2013.01); *B01D 53/0446* (2013.01); *B01D 53/0462* (2013.01); *B01J 20/26* (2013.01); *B01J 20/28047* (2013.01); *B01J 20/3483* (2013.01); *B01D 2257/504* (2013.01)

(58) Field of Classification Search
CPC .... B01D 53/02; B01D 53/04; B01D 53/0438; B01D 53/0446; B01D 53/0462; B01D 53/10; B01D 53/228; B01D 69/02; B01D 69/147; B01D 69/148; B01D 2257/504; B01D 2325/22; B01J 20/26; B01J 20/28047; B01J 20/2805; B01J 20/3483

USPC ...... 96/143–146, 154, 4, 11; 95/45, 51, 114, 95/115, 139
See application file for complete search history.

(56) References Cited

U.S. PATENT DOCUMENTS

| | | | |
|---|---|---|---|
| 3,498,026 | A | 3/1970 | Messinger et al. |
| 3,818,679 | A | 6/1974 | Klass et al. |

(Continued)

FOREIGN PATENT DOCUMENTS

| | | |
|---|---|---|
| DE | 3731892 | 4/1989 |
| JP | S5564824 | 5/1980 |

(Continued)

OTHER PUBLICATIONS

Alami et al., "Materials and logistics for carbon dioxide capture, storage and utilization," Science of the Total Environment, Feb. 2020, 717:137221 13, pages.

(Continued)

*Primary Examiner* — Frank M Lawrence, Jr.
(74) *Attorney, Agent, or Firm* — Fish & Richardson P.C.

(57) ABSTRACT

A carbon dioxide containing fluid is flowed through a membrane in an open position. The membrane encapsulates an adsorbent bed operating at a first temperature. The adsorbent bed adsorbs at least a portion of the carbon dioxide of the carbon dioxide containing fluid. The membrane is adjusted to a closed position, thereby isolating the adsorbent bed and preventing fluid flow into and out of the membrane. The adsorbent bed is heated to a second temperature, thereby desorbing the carbon dioxide captured from the carbon dioxide containing fluid. The membrane is adjusted to the open position. The adsorbent bed is cooled to the first temperature.

18 Claims, 3 Drawing Sheets

(56) References Cited

U.S. PATENT DOCUMENTS

| | | | | |
|---|---|---|---|---|
| 7,501,008 | B2* | 3/2009 | Eshraghi | H01M 8/002 95/55 |
| 8,043,588 | B2 | 10/2011 | Hustad et al. | |
| 8,500,859 | B2 | 8/2013 | Eisenbeger | |
| 10,173,145 | B2 | 1/2019 | Nishibe et al. | |
| 2006/0032372 | A1* | 2/2006 | Dauber | G11B 33/1486 95/90 |
| 2012/0090470 | A1* | 4/2012 | McKenna | B01D 53/0415 96/147 |
| 2013/0202517 | A1 | 8/2013 | Ayala et al. | |
| 2015/0231561 | A1 | 8/2015 | Reardon et al. | |
| 2019/0282945 | A1* | 9/2019 | Lu | G11B 33/1486 |

FOREIGN PATENT DOCUMENTS

| | | | |
|---|---|---|---|
| JP | H08323137 | | 12/1996 |
| WO | WO 83/02054 A | * | 6/1983 |
| WO | WO 2010107942 | | 9/2010 |
| WO | WO 2013028688 | | 2/2013 |
| WO | WO 2014170184 | | 10/2014 |

OTHER PUBLICATIONS

D'Allesandro et al., "Carbon dioxide capture: prospects for new materials," Angewandte Chemie International Edition, Jul. 2010, 49(35):6058-6082, 25 pages.

Hu et al., "Development of novel mordenite-filled chitosan-poly(acrylic acid) polyelectrolyte complex membrances for pervaporation dehydration of ethlyene glycol aqueos solution," Journal of Membrane Science, Mar. 2007, 293(1-2):142-150, 9 pages.

Wang et al., "Moisture swing sorbent for carbon dioxide capture from ambient air," Environmental Science & Technology, Jun. 2011, 45(15):6670-6675, 6 pages.

PCT Invitation to Pay Additional Fees and, where applicable, Protest Fee in International Appln. No PCT/US2022/011164, dated May 6, 2022, 16 pages.

U.S. Appl. No. 17/140,274, filed Jan. 4, 2021, Younes et al.

IEA, "Putting CO2 to Use: Creating value from emissions," Sep. 2019, 86 pages.

Chu et al., "Negatively Thermoresponsive Membranes with Functional Gates Driven by Zipper-Type Hydrogen-Bonding Interactions," Angew. Chem, Int. Ed., 2005, 44:2124-2127.

Fasihi et al., "Techno-economic assessment of CO2 direct air capture plants," Journal of Cleaner Production, Jul. 2019, 224:957-980.

Goeppert et al., "Air as the renewable carbon source of the future: an overview of CO2 capture from the atmosphere," Energy & Environmental Science, 2012, 5:7833-7853.

Keith et al., "A Process for Capturing CO 2 from the Atmosphere," Joule, Aug. 2018, 23 pages.

Knipe et al., "CO2 Absorption and Regeneration Cycling with Micro-Encapsulated CO2 Sorbents," Environmental Science & Technology, Feb. 2018, 24 pages.

Park et al., "Reversible Self-Actuated Thermo-Responsive Pore Membrane," Scientific Report, Dec. 2016, 10 pages.

Pitchaimani et al., "Manufacturable plastic microfluidic valves using thermal actuation," Lab on a Chip, Aug. 2009, 9(21):3082-3087.

Vericella et al., "Encapsulated liquid sorbents for carbon dioxide capture," Nature Communications, Feb. 2015, 7 pages.

Wang et al., "CO2 capture by solid adsorbents and their application: current status and new trends," Energy & Environmental Science, 2011, 4:42-55.

PCT International Search Report and Written Opinion in International Appln. No PCT/US2022/011164, dated Jun. 30, 2022, 19 pages.

PCT International Search Report and Written Opinion in International Appln. No. PCT/US2022/011169, dated May 3, 2022, 14 pages.

* cited by examiner

CARBON DIOXIDE CAPTURE

TECHNICAL FIELD

This disclosure relates to carbon dioxide capture.

BACKGROUND

With rising concerns of climate change and greenhouse gas emissions, carbon dioxide capturing processes can be an avenue for mitigating emissions. Typically, carbon dioxide captured from large point sources, such as cement factories and biomass power plants, is transported and sequestered in an underground geological formation, so that it does not enter the atmosphere. In some cases, carbon dioxide can be captured from air. In some cases, the carbon dioxide captured in such processes can be used as part of a feedstock for creating synthetic fuels.

SUMMARY

This disclosure describes technologies relating to carbon dioxide capture. Certain aspects of the subject matter described can be implemented as a system. The system includes a membrane, an adsorbent bed, and a pressure change device. The pressure change device can include, for example, a fan, a compressor, a vacuum pump, or a natural draft tower. The membrane includes a stimulus-responsive polymer and defines multiple pores. A size of each of the pores is adjustable based on the stimulus-responsive polymer responding to a change in surrounding conditions. In some implementations, the stimulus-responsive polymer is configured to, in response to exposure to a stimulus, increase a size of each of the pores, thereby adjusting the membrane to an open position in which fluid flow into the membrane and fluid flow out of the membrane are allowed. In some implementations, the stimulus is at least one of a magnetic field, an electric field, or water vapor. In some implementations, the stimulus-responsive polymer is configured to, in response to removing the stimulus, decrease the size of each of the pores, thereby adjusting the membrane to a closed position in which fluid flow into the membrane and fluid flow out of the membrane are prevented. In some implementations, the stimulus-responsive polymer is a thermo-responsive polymer. In some implementations, the thermo-responsive polymer is configured to, in response to a temperature decrease resulting in a temperature equal to or less than an upper critical solution temperature, increase a size of each of the pores, thereby adjusting the membrane to an open position in which fluid flow into the membrane and fluid flow out of the membrane are allowed. In some implementations, the thermo-responsive polymer is configured to, in response to a temperature increase resulting in a temperature greater than the upper critical solution temperature, decrease the size of each of the pores, thereby adjusting the membrane to a closed position in which fluid flow into the membrane and fluid flow out of the membrane are prevented. In some implementations, the thermo-responsive polymer is configured to, in response to a temperature increase resulting in a temperature equal to or greater than a lower critical solution temperature, increase a size of each of the pores, thereby adjusting the membrane to an open position in which fluid flow into the membrane and fluid flow out of the membrane are allowed. In some implementations, the thermo-responsive polymer is configured to, in response to a temperature decrease resulting in a temperature less than the lower critical solution temperature, decrease the size of each of the pores, thereby adjusting the membrane to a closed position in which fluid flow into the membrane and fluid flow out of the membrane are prevented. The adsorbent bed is encapsulated within the membrane. Fluid communication between the adsorbent bed and an exterior of the membrane is controlled by the size of the pores. The adsorbent bed is configured to adsorb at least a portion of carbon dioxide from a carbon dioxide containing fluid flowing through the membrane while the membrane is in the open position, such that the fluid exiting the membrane has a decreased carbon dioxide content in comparison to the fluid entering the membrane. The adsorbent bed is configured to, in response to being heated, desorb the portion of carbon dioxide captured from the carbon dioxide containing fluid. The pressure change device is configured to facilitate at least one of fluid flow into the membrane, fluid flow out of the membrane, or fluid flow through the membrane.

This, and other aspects, can include one or more of the following features.

In some implementations, the membrane includes a mixture of thermo-responsive polymers.

In some implementations, the mixture of thermo-responsive polymers includes a first thermo-responsive polymer having a first upper critical solution temperature and a second thermo-responsive polymer having a second upper critical solution temperature. In some implementations, the second upper critical solution temperature is 20 degrees Celsius (° C.) to 50° C. greater than the first upper critical solution temperature.

In some implementations, the first upper critical solution temperature and the second upper critical solution temperature are in a range of from 10° C. to 150° C.

In some implementations, the first upper critical solution temperature and the second upper critical solution temperature are in a range of from 60° C. to 90° C.

Certain aspects of the subject matter described can be implemented as a method. A carbon dioxide containing fluid is flowed through a membrane in an open position. The membrane encapsulates an adsorbent bed operating at a first temperature. The adsorbent bed adsorbs at least a portion of the carbon dioxide of the carbon dioxide containing fluid. The membrane is adjusted to a closed position, thereby isolating the adsorbent bed and preventing fluid flow into and out of the membrane. The adsorbent bed is heated to a second temperature, thereby desorbing the carbon dioxide captured from the carbon dioxide containing fluid. The membrane is adjusted to the open position. The adsorbent bed is cooled to the first temperature.

This, and other aspects, can include one or more of the following features.

In some implementations, the membrane includes a porous base encapsulating the adsorbent bed. In some implementations, the membrane includes a lattice structure surrounding and supported by the porous base. In some implementations, the lattice structure defines multiple void spaces. In some implementations, the membrane includes multiple hydrogel particles. In some implementations, each hydrogel particle is disposed within a respective void space of the lattice structure. In some implementations, each hydrogel particle is configured to be adjustable between in an un-expanded form and an expanded form. In the un-expanded form, a maximum dimension of the hydrogel particle is smaller than a minimum dimension of the respective void space within which the hydrogel particle is disposed, thereby allowing fluid flow into and out of the membrane. In the expanded form, the maximum dimension of the hydrogel particle is increased, such that the hydrogel particle in the expanded form fills the respective void space within which the hydrogel particles is disposed, thereby preventing fluid flow into and out of the membrane. In some implementations, adjusting the membrane to the closed position includes adjusting the hydrogel particles to the expanded form. In some implementations, adjusting the membrane to the open position includes adjusting the hydrogel particles to the un-expanded form.

In some implementations, adjusting the hydrogel particles to the expanded form includes flowing steam to the membrane.

In some implementations, adjusting the membrane to the closed position includes flowing steam to the membrane, thereby causing the membrane to reach a third temperature at which the hydrogel particles are adjusted to the expanded form. In some implementations, the third temperature is intermediate of the first temperature and the second temperature. In some implementations, continuing to flow steam to the membrane then causes the adsorbent bed to reach the second temperature at which the captured carbon dioxide is desorbed from the adsorbent bed while the membrane is in the closed position.

In some implementations, the membrane includes a thermo-responsive polymer. In some implementations, the membrane defines multiple pores. In some implementations, a size of each of the pores is adjustable based on the thermo-responsive polymer responding to a change in temperature.

In some implementations, adjusting the membrane to the closed position includes heating the membrane to a third temperature at which the thermo-responsive polymer decreases the size of each of the pores. In some implementations, the third temperature is intermediate of the first temperature and the second temperature.

In some implementations, the third temperature is in a range of from 10 degrees Celsius (° C.) to 150° C.

In some implementations, the third temperature is in a range of from 60° C. to 90° C.

In some implementations, flowing the carbon dioxide containing fluid through the membrane in the open position, adjusting the membrane to the closed position, and heating the adsorption bed to the second temperature proceed at atmospheric pressure.

In some implementations, desorbing the carbon dioxide captured from the carbon dioxide containing fluid proceeds at an operating pressure in a range of from 0.1 millibar (mbar) to atmospheric pressure.

In some implementations, desorbing the carbon dioxide captured from the carbon dioxide containing fluid proceeds at an operating pressure in a range of from 20 mbar to 500 mbar.

Certain aspects of the subject matter described can be implemented as a system. The system includes a membrane and an adsorbent bed. The membrane includes a porous base, a lattice structure, and hydrogel particles. The lattice structure surrounds the porous base. The lattice structure is supported by the porous base. The lattice structure defines void spaces. Each hydrogel particle is disposed within a respective void space of the lattice structure. Each hydrogel particle is configured to be adjustable between an un-expanded form and an expanded form. In the un-expanded form, a maximum dimension of the hydrogel particle is smaller than a minimum dimension of the respective void space within which the hydrogel particle is disposed, thereby allowing fluid flow into and out of the membrane. In the expanded form, the maximum dimension of the hydrogel particle is increased, such that the hydrogel particle in the expanded form fills the respective void space within which the hydrogel particle is disposed, thereby preventing fluid flow into and out of the membrane. The adsorbent bed is encapsulated within the porous base of the membrane. Fluid communication between the adsorbent bed and an exterior of the membrane is controlled by the hydrogel particles. The adsorbent bed is configured to adsorb at least a portion of carbon dioxide from a carbon dioxide containing fluid flowing through the membrane while the hydrogel particles are in the un-expanded form, such that fluid exiting the membrane has a decreased carbon dioxide content in comparison to the carbon dioxide containing fluid entering the membrane. The adsorbent bed is configured to, in response to being heated, desorb the portion of carbon dioxide captured from the carbon dioxide containing fluid.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes carbon dioxide capturing systems and methods. The system includes an adsorbent bed encapsulated within a smart, adjustable membrane. The membrane is adjustable between an open position, which allows fluid flow into and out of the membrane, and a closed position, which prevents fluid flow into and out of the membrane. The membrane can adjust between open and closed positions based on a triggering operating condition, such as a change in temperature or introduction of a triggering fluid, such as water. The subject matter described in this disclosure can be implemented in particular implementations, so as to realize one or more of the following advantages. By encapsulating the adsorbent bed within the smart, adjustable membrane, the described systems and methods can be implemented in smaller enclosed volumes in comparison to conventional carbon dioxide capturing systems and methods. In turn, the smaller enclosed volumes made possible by the described systems and methods can require less operating costs associated with vacuum pumping and/or compressing fluids to facilitate flow. In some cases, the smaller enclosed volumes made possible by the described systems and methods can also improve the resulting carbon dioxide purity, as the volume of residual air can be decreased in comparison to conventional carbon dioxide capturing systems and methods. By implementing the described systems and methods, the adsorbent beds themselves can be increased in size and arranged freely due to the reduced enclosed volume requirements and the removal of large air/flue gas isolation valves. Further, larger pressure change devices can be implemented in the systems and methods described, which can reduce capital and operating costs in comparison to the use of multiple, smaller pressure change devices.

Figure 1A:
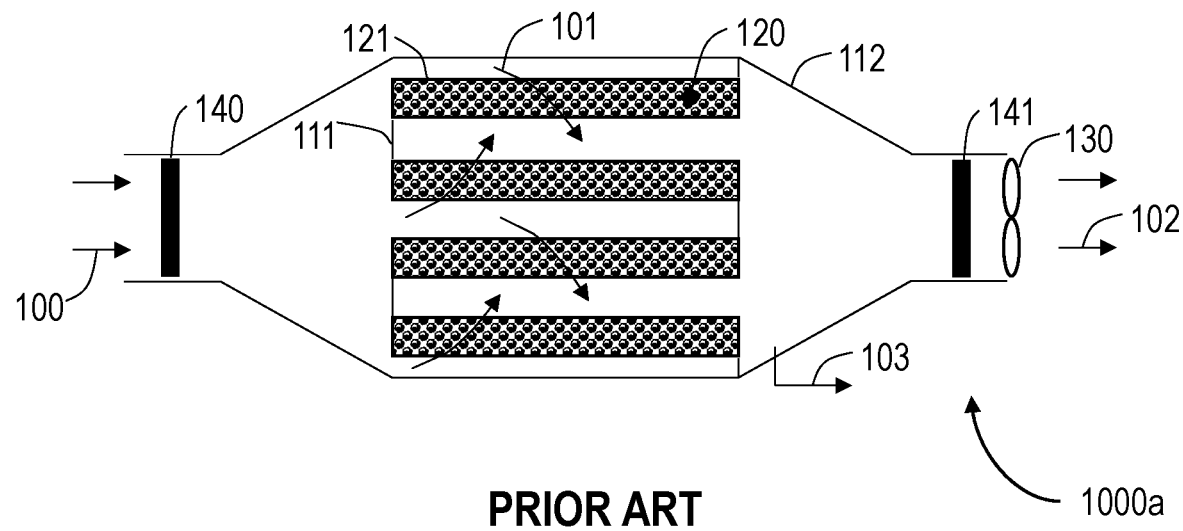
FIG. 1A is a schematic diagram of an example prior art system for carbon dioxide capture.

FIG. 1A is a schematic diagram of an example prior art system 100a for carbon dioxide capture. In general, in adsorption based carbon dioxide capturing processes, the sorbent undergoes four phases: Phase I, which is the adsorption phase where carbon dioxide is captured from a carbon dioxide containing fluid; Phase II, which is the heating phase where the sorbent is heated to reach a desired desorption temperature; Phase III, which is the desorption phase where the sorbent is maintained at a temperature equal to or greater than the desorption temperature to desorb the captured carbon dioxide from the sorbent, which also results in regenerating the sorbent; and Phase IV, which is the cooling phase where the sorbent is cooled to return to its initial temperature to start another cycle starting back at Phase I.

Phases I and III are typically linked to the sorbent material itself, while Phases II and IV are typically linked to the sorbent material, the process configuration/conditions, and capability to recover the heat that is rejected during the cooling process in Phase IV and use the recovered heat in the heating process in Phase II. In some cases, the working capacity of the sorbent can be increased by decreasing the partial pressure of carbon dioxide. Decreasing the partial pressure of carbon dioxide can be carried out by introducing a sweep gas in Phase III, regenerating the sorbent during Phase III at a decreased pressure, or a combination of both. By increasing the working capacity of the sorbent, the amount of sorbent material used can be decreased while still being capable of capturing the same total amount of carbon dioxide, thereby reducing the energy consumption of the system, which can be beneficial especially for cases where carbon dioxide capture is desired from fluids containing low concentrations of carbon dioxide (for example, about 400 parts per million or less).

In Phase I, a carbon dioxide containing fluid 100 is flowed into an enclosure 112 of the system 100a through valve 140. The carbon dioxide containing fluid flows (depicted by flow arrow 101) through an adsorbent bed 120 which includes a carbon dioxide capture sorbent configured to adsorb at least a portion of the carbon dioxide contained in the carbon dioxide containing fluid 100. After flowing through the adsorbent bed 120, a carbon dioxide-lean fluid 102 flows out of the enclosure 112 through valve 141. Pressure change device 130 facilitates fluid flow into the enclosure 112, out of the enclosure 112, and through the adsorbent bed 120. The pressure change device 130 can include, for example, a fan, a compressor, a vacuum pump, or a natural draft tower. In this particular example, the system 100a includes multiple adsorbent beds 120, and each of the adsorbent beds 120 are encapsulated by a porous material 121. The porous material 121 provides structural support and/or containment for the adsorbent beds 120 while allowing fluid flow into and out of the adsorbent beds 120. Inserts 111 are located between the adsorbent beds 120, and the inserts 111 direct flow of fluid through the adsorbent beds 120 and prevent fluid flow from bypassing the adsorbent beds 120. For example, the inserts 111 prevent fluid from flowing around the adsorbent beds 120 and ensures fluid flows through the adsorbent beds 120.

Typically, for Phase II, the valves 140 and 141 are closed and define a closed volume within the enclosure 112. The valves 140 and 141 can be closed at the beginning of, at the end of, or at specific conditions during Phase II. In some cases, a heating medium (such as water in the form of steam) is circulated in the adsorbent beds 120. In some cases, the adsorbent beds 120 include an internal heat exchanger that circulates the heating medium and transfers the heat from the heating medium to the sorbent. In some cases, heat is provided by an electric heater integrated with the adsorbent beds 120.

In Phase III, the valves 140 and 141 remain closed, and the captured carbon dioxide begins to desorb from the adsorbent beds 120 as the operating temperature of the adsorbent beds 120 reaches desorption conditions. Flowline 103 can be used to discharge the captured carbon dioxide from the system 100a while the sorbent of the adsorbent beds 120 is being regenerated.

Because the valves 140 and 141 are closed during Phases II and III, the carbon dioxide containing fluid can remain trapped within the enclosure 112. To extract a high-purity carbon dioxide stream, the enclosure 112 can be evacuated of the non-$CO_2$ gas molecules in Phase II using, for example, a vacuum pump or compressor. In some implementations, vacuum conditions are maintained throughout Phase III to allow for increased carbon dioxide recovery. As described previously, operating the closed volume within the enclosure 112 at decreased pressure can allow for increased carbon dioxide recovery using the sorbent of the adsorbent beds 120.

Once the sorbent has reached its working capacity, and the captured carbon dioxide has been recovered from the closed volume within the enclosure 112, Phase IV can begin. Typically, for Phase IV, the valves 140 and 141 are closed. In some cases, a cooling medium (such as liquid water) is circulated in the adsorbent beds 120. In some cases, the adsorbent beds 120 include an internal heat exchanger that circulates the cooling medium and transfers the heat from the sorbent to the cooling medium. Once the adsorbent beds 120 have returned to an initial temperature (for example, the temperature at which Phase I proceeds), the valves 140 and 141 can be opened in preparation for the cycle to restart at Phase I. In some implementations, the valves 140 and 141 are opened before the end of Phase IV, for example, when the adsorbent beds 120 reach specific conditions.

Figure 1B:
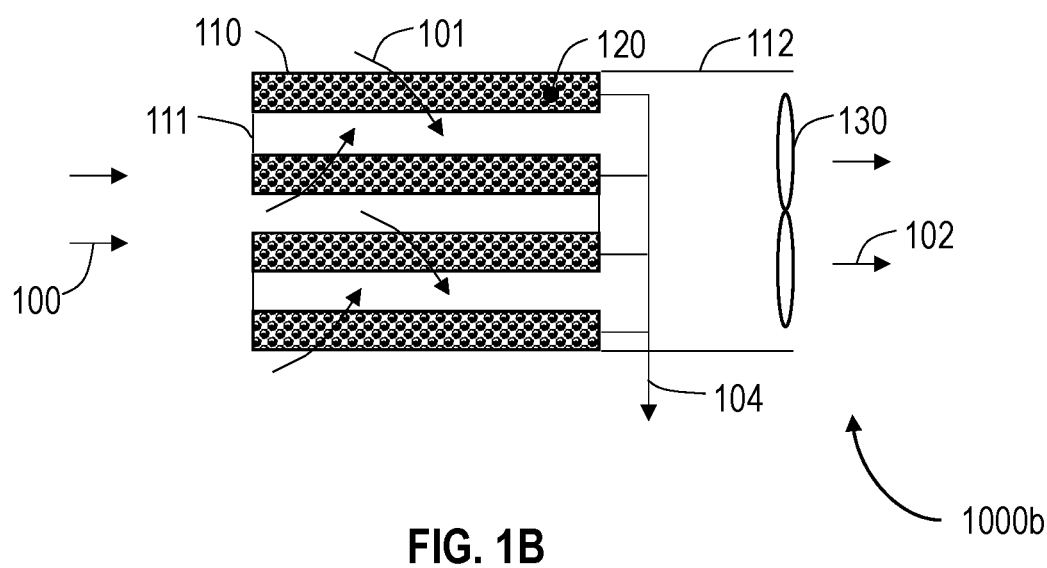
FIG. 1B is a schematic diagram of an example system for carbon dioxide capture, according to the concepts herein.

FIG. 1B is a schematic diagram of an example system 100b for carbon dioxide capture, according to the concepts herein. The system 100b includes a membrane 110, an adsorbent bed 120, and a pressure change device 130. The adsorbent bed 120 is encapsulated within the membrane 110. Although shown in FIG. 1B as being located downstream of the adsorbent bed 120, the pressure change device 130 can be located upstream of the adsorbent bed 120. As shown in FIG. 1B, the system 100b can include multiple adsorbent beds 120, and each adsorbent bed 120 is encapsulated in its own membrane 110. In some implementations, the system 100b includes inserts 111 (similar to system 100a) located between the adsorbent beds 120, and the inserts 111 direct flow of fluid through the adsorbent beds 120 and prevent fluid flow from bypassing the adsorbent beds 120. For example, the inserts 111 prevent fluid from flowing around the adsorbent beds 120 and ensures fluid flows through the adsorbent beds 120. The system 100b can include an enclosure 112 (similar to, but smaller than the enclosure 112 of system 100a).

The membrane 110 is configured to be adjustable between an open position and a closed position. In the open position, fluid flow into the membrane 110 and fluid flow out of the membrane 110 are allowed. In the closed position, fluid flow into the membrane 110 and fluid flow out of the membrane 110 are prevented. In some implementations, adjusting the membrane 110 between open and closed positions involves a triggering stimulus, such as a change in temperature, application of a magnetic field, application of an electric field, or introduction of a chemical species.

The membrane includes a stimulus-responsive polymer that changes properties in response to a change in surrounding condition, such as a change in temperature, application of a magnetic field, application of an electric field, or introduction of a chemical species. In some implementations, the stimulus-responsive polymer is a thermo-responsive polymer that changes properties in response to certain changes in temperature. Some non-limiting examples of appropriate thermo-responsive polymers include polyacrylamide and poly(acrylic acid). In some implementations, the membrane 110 defines multiple pores, and the size of the pores is adjustable based on the thermo-responsive polymer responding to a change in temperature. In some implementations, the thermo-responsive polymer is configured to adjust the membrane 110 to the closed position in response to a temperature greater than an upper critical solution temperature (UCST). In some implementations, the thermo-responsive polymer is configured to adjust the membrane 110 to the open position in response to a temperature equal to or less than the UCST. In some implementations, the UCST of the thermo-responsive polymer is in a range of from 10 degrees Celsius (° C.) to 150° C. In some implementations, the UCST of the thermo-responsive polymer is in a range of from 60° C. to 90° C.

In some implementations, the membrane 110 includes a mixture of thermo-responsive polymers. In some implementations, the mixture of thermo-responsive polymers includes a first thermo-responsive polymer having a first UCST and a second thermo-responsive polymer having a second UCST. In some implementations, the second UCST is 20° C. to 50° C. greater than the first UCST. In some implementations, the first UCST and the second UCST are in a range of from 10° C. to 150° C. In some implementations, the first UCST and the second UCST are in a range of from 60° C. to 90° C.

The adsorbent bed 120 is configured to adsorb at least a portion of carbon dioxide from a carbon dioxide containing fluid 101 (for example, air) flowing through the membrane 110 while the membrane 110 is in the open position, such that the fluid 102 exiting the membrane 110 has a decreased carbon dioxide content in comparison to the fluid 100 entering the membrane 110. In response to being heated, the adsorbent bed 120 is configured to desorb the carbon dioxide captured from the carbon dioxide containing fluid 101. In some implementations, the adsorbent bed 120 includes a strong base (such as lithium hydroxide, potassium hydroxide, calcium hydroxide, or sodium hydroxide), a zeolite (such as silica type X zeolite or 13X zeolite), a metal organic framework (such as MOF SIFSIX-3-Cu), an amine based anionic exchange resin, a supported amine, an organoamine adsorbent, or a combination of these.

The pressure change device 130 is configured to facilitate fluid flow into the membrane, fluid flow out of the membrane, fluid flow through the membrane, or any combination of these. The pressure change device 130 can include a fan, a compressor, a vacuum pump, a natural draft tower, or a combination of these. The pressure change device 130 of system 100b can be larger than the pressure change device 130 of system 100a, as the adsorbent beds 120 of system 100b can be larger in comparison to the adsorbent beds 120 of system 100a.

The carbon dioxide containing fluid 100 (for example, air) flows through the system 100b across the adsorbent beds 120 (depicted by flow arrow 101) and out of the system 100b through the pressure change device 130 (depicted by flow arrow 102). The fluid 102 exiting the system 100b has a decreased carbon dioxide content in comparison to the fluid 100 entering the system 100b. By nature of being adjustable between open and closed positions, the membrane 110 can substitute the function of the valves 140 and 141 of system 100a and control fluid flow into and out of the adsorbent beds 120. The membrane 110 also allows for the enclosure 112 of system 100b to be smaller than that of system 100a. The carbon dioxide captured from the carbon dioxide containing fluid 100 by the adsorbent beds 120 exit the system 100b via a carbon dioxide extraction port 104.

Figure 2A:
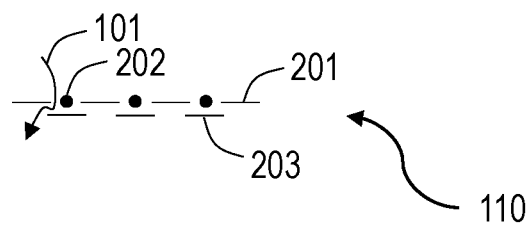
FIGS. 2A & 2B are schematic diagrams that illustrate a progression of an example hydrogel membrane operation.
Figure 2B:
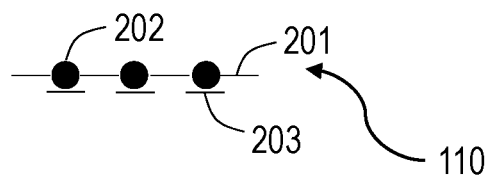

FIGS. 2A & 2B are schematic diagrams that illustrate a progression of an example membrane 110 operation. In some implementations, the membrane 110 includes a lattice structure 201, hydrogel particles 202, and a porous base 203. In such implementations, the porous base 203 encapsulates the adsorbent bed 120 and supports the lattice structure 201. The lattice structure 201 surrounds the porous base 203 and defines void spaces. Each hydrogel particle 202 is disposed within a respective void space of the lattice structure 201. The hydrogel particles 202 are configured to be adjustable between an un-expanded form and an expanded form. In the un-expanded form, a maximum dimension of the hydrogel particle 202 is smaller than a minimum dimension of the respective void space within which the hydrogel particle 202 is disposed, thereby allowing fluid flow into (depicted by flow arrow 101) and out of the membrane 110. In the expanded form, the maximum dimension of the hydrogel particle 202 is increased, such that the hydrogel particle 202 fills the respective void space within which the hydrogel particle 202 is disposed, thereby preventing fluid flow into and out of the membrane 110. FIG. 2A depicts the hydrogel particles 202 in un-expanded form (membrane 110 in open position), while FIG. 2B depicts the hydrogel particles 202 in expanded form (membrane 110 in closed position). In some implementations, introducing steam to the membrane 110 (and therefore the hydrogel particles 202) causes the hydrogel particles 202 to expand into their expanded forms, resulting in the membrane 110 being adjusted to the closed position.

In some implementations, the hydrogel particles 202 include polyacrylamide, poly(acrylic acid), poly(N,N-diemthyl(acrylamidopropyl) ammonium propane sulfonate, ureido-derivatized copolymer, poly(allylurea)(PU) copolymer, poly(L-citrulline) copolymer, or a combination of these. In some implementations, the porous base 203 includes ceramic material, metallic foam, silica, or a combination of these. In some implementations, the porous base 203 is in the form of a mesh or a grid. In some implementations, the lattice structure 201 includes a non-porous polymer, a 2D material (such as graphene), polytetrafluoroethylene (PTFE), or a combination of these. In some implementations, the lattice structure 201 provides sufficient structural integrity that the porous base 203 can be omitted from the membrane 110.

In some implementations, the membrane 110 includes a thermo-responsive polymer that is configured to adjust the membrane 110 to the closed position in response to a temperature less than a lower critical solution temperature (LCST). In such implementations, the thermo-responsive polymer can be located on a periphery (such as a circumference) of the void spaces. The thermo-responsive polymer would shrink when exposed to a temperature greater than the LCST, thereby increasing the sizes of the void spaces and allowing fluid flow through the membrane 110. When cooled to a temperature less than the LCST, the thermo-responsive polymer would expand, thereby decreasing the sizes of the void spaces and preventing fluid flow through the membrane 110.

In cases in which the membrane 110 includes a mixture of thermo-responsive polymers, the membrane 110 can be designed to be porous during Phase I, while being half porous (restricted flow and/or selective material flow) during portions of Phases II and IV, and completely sealed during Phase III. In such implementations, the membrane 110 can be composed of two thermo-responsive polymers or a thermo-responsive polymer blend with distinct USCT values, for example, material A with USCT of 50° C. and material B with USCT of 80° C. In some implementations, the adsorbent bed 120 is heated during Phase II (for example, at atmospheric pressure without activating vacuum pump connected to line 104). In some implementations, as the adsorbent bed 120 is heated, and the temperature reaches the USCT of material A (for example, 50° C.), the void spaces partially close, thereby allowing for the pressure to build up slowly and push out impurities, such as water vapor, nitrogen, oxygen, and argon molecules out of the adsorbent bed 120 as such species have smaller kinetic diameters in comparison to carbon dioxide. This mechanism can allow for the production of a carbon dioxide stream of increased purity, with decreased content of non-condensable gases. In some implementations, as the adsorbent bed 120 is heated, and the temperature reaches the UCST of material B (for example, 80° C.), the void spaces completely close, thereby allowing for the confinement of the desorbed carbon dioxide and subsequent extraction through line 104. This mechanism can allow for maintaining atmospheric pressure in the adsorbent bed 120 or a vacuum pressure in a range of from 0.1 millibar (mbar) to atmospheric pressure, in a range of from 0.1 mbar to 900 mbar, or in a range of from 20 mbar to 500 mbar.

In some implementations, the membrane 110 includes a thermo-responsive polymer with a UCST that is less than a desorption temperature of the adsorbent bed 120 and greater than ambient temperature. In such implementations, the void spaces of the membrane 110 close during Phase II, and a vacuum can be pulled in the adsorbent bed 120, which can accelerate the desorption of carbon dioxide from the adsorbent bed 120. The mechanism of the membrane 110 adjusting to the closed position relatively early may, in some cases, limit purging contaminants from the adsorbent bed 120.

In some implementations, the membrane 110 can be designed to be porous during Phase I (for example, at ambient temperature), while being half porous during Phase III and portions of Phases II and IV, such that water vapor can flow through the membrane 110 and out of the adsorbent bed 120, while carbon dioxide and other air constituents (such as nitrogen, argon, and oxygen) are prevented from flowing through the membrane 110 and trapped in the adsorbent bed 120 (due to water having the smallest kinetic diameter in comparison to the other species). In such implementations, Phases II, III, and IV can be operated at atmospheric pressure or greater in order to provide a driving force to push undesired constituents (non-$CO_2$ species) out of the adsorbent bed 120. In some cases, Phase III can proceed at a vacuum pressure. However, in such cases, water vapor may be drawn from the atmosphere and into the adsorbent bed 120, which can decrease carbon dioxide purity.

Figure 3:
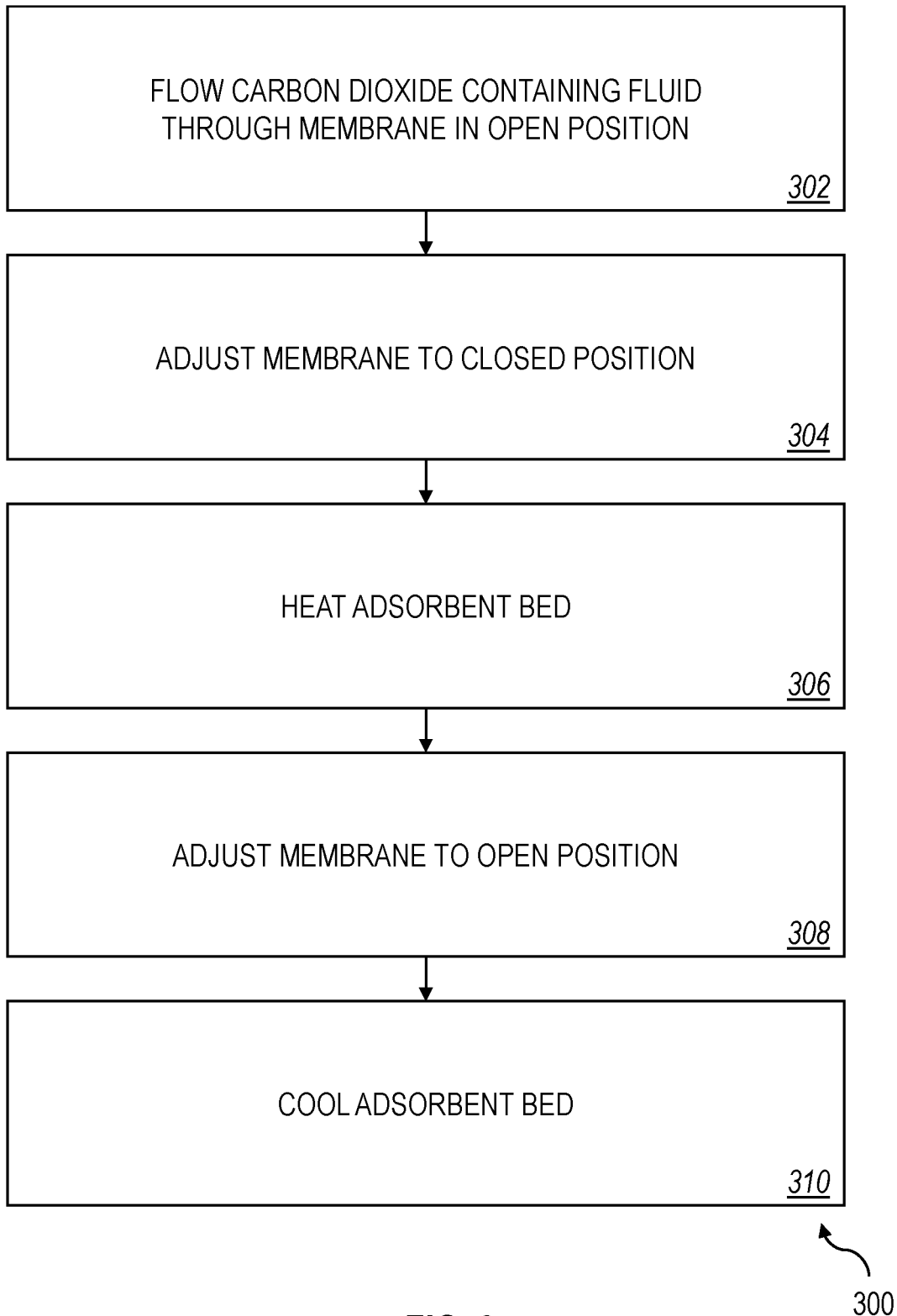
FIG. 3 is a flow chart of an example method for carbon dioxide capture.

FIG. 3 is a flow chart of an example method 300 for carbon dioxide capture. The method 300 can be, for example, implemented by the system 100b. At step 302, a carbon dioxide containing fluid (such as the carbon dioxide containing fluid 100) is flowed through a membrane (such as the membrane 110) in an open position. As described previously, the membrane 110 encapsulates an adsorbent bed (such as the adsorbent bed 120). The adsorbent bed 120 can operate at a first temperature (for example, ambient temperature) during step 302. The adsorbent bed 120 adsorbs at least a portion of the carbon dioxide of the carbon dioxide containing fluid 100 during step 302. In some implementations, the carbon dioxide containing fluid 100 is flowed through the membrane in the open position at step 302 at atmospheric pressure. Step 302 can be considered a part of Phase I.

At step 304, the membrane 110 is adjusted to a closed position, thereby isolating the adsorbent bed 120 and preventing fluid flow into and out of the membrane 110. In some implementations, the membrane 110 is adjusted to the closed position at step 304 at atmospheric pressure. In implementations where the membrane 110 includes the lattice structure 201, hydrogel particles 202, and the porous base 203, adjusting the membrane 110 to the closed position at step 304 includes adjusting the hydrogel particles 202 to the expanded form.

In some implementations, adjusting the hydrogel particles 202 to the expanded form includes flowing steam to the membrane 110. Flowing steam to the membrane 110 can cause the membrane 110 to reach a third temperature at which the hydrogel particles 202 are adjusted to their expanded forms. The third temperature can be intermediate of the first temperature and the second temperature.

In implementations where the membrane 110 includes a thermo-responsive polymer, adjusting the membrane 110 to the closed position at step 304 can include heating the membrane 110 to a third temperature at which the thermo-responsive polymer decreases the sizes of pores of the membrane 110. The third temperature can be, for example, the UCST of the thermo-responsive polymer. In some implementations, the third temperature is in a range of from 10° C. to 150° C. In some implementations, the third temperature is in a range of from 60° C. to 90° C.

At step 306, the adsorbent bed 120 is heated to a second temperature, thereby desorbing the carbon dioxide captured from the carbon dioxide containing fluid 100 and regenerating the adsorbent bed 120. In some implementations, heating the adsorbent bed 120 to the second temperature includes flowing steam to the membrane 110 (for example, continuing on from flowing steam to the membrane 110 in step 304). In some implementations, the adsorbent bed 120 is heated to the second temperature at step 306 at atmospheric pressure. In some implementations, once the adsorbent bed 120 reaches the second temperature, the carbon dioxide begins desorbing from the adsorbent bed 120. In some implementations, the desorption of carbon dioxide from the adsorption bed 120 proceeds at an operating pressure less than atmospheric pressure, for example, in a range of from 0.1 mbar to atmospheric pressure, in a range of from 0.1 mbar to 900 mbar, or in a range of from 20 mbar to 500 mbar. Steps 304 and 306 can be considered a part of Phase II. The desorption of carbon dioxide at step 306 can be considered a part of Phase III.

At step 308, the membrane 110 is adjusted to an open position. In implementations where the membrane 110 includes the lattice structure 201, hydrogel particles 202, and the porous base 203, adjusting the membrane 110 to the closed position at step 308 includes adjusting the hydrogel particles 202 to the un-expanded form.

At step 310, the adsorbent bed 120 is cooled to the first temperature. Step 310 can be considered a part of Phase IV. The method 300 can then repeat, starting back at step 302.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. A system comprising:
    a membrane comprising a thermo-responsive polymer and defining a plurality of pores, a size of each of the pores is adjustable based on the thermo-responsive polymer responding to a change in temperature, the thermo-responsive polymer configured to:
        in response to a temperature decrease resulting in a temperature equal to or less than an upper critical solution temperature, increase a size of each of the pores, thereby adjusting the membrane to an open position in which fluid flow into the membrane and fluid flow out of the membrane are allowed, and
        in response to a temperature increase resulting in a temperature greater than the upper critical solution temperature, decrease the size of each of the pores, thereby adjusting the membrane to a closed position in which fluid flow into the membrane and fluid flow out of the membrane are prevented;
    an adsorbent bed encapsulated within the membrane, wherein fluid communication between the adsorbent bed and an exterior of the membrane is controlled by the size of the pores, and the adsorbent bed is configured to:
        adsorb at least a portion of carbon dioxide from a carbon dioxide containing fluid flowing through the membrane while the membrane is in the open position, such that the fluid exiting the membrane has a decreased carbon dioxide content in comparison to the fluid entering the membrane, and
        in response to being heated, desorb the portion of carbon dioxide captured from the carbon dioxide containing fluid; and
    a pressure change device configured to facilitate at least one of fluid flow into the membrane, fluid flow out of the membrane, or fluid flow through the membrane.

2. The system of claim 1, wherein the membrane comprises a mixture of thermo-responsive polymers.

3. The system of claim 2, wherein the mixture of thermo-responsive polymers comprises a first thermo-responsive polymer having a first upper critical solution temperature and a second thermo-responsive polymer having a second upper critical solution temperature, the second upper critical solution temperature 20 degrees Celsius (° C.) to 50° C. greater than the first upper critical solution temperature.

4. The system of claim 3, wherein the first upper critical solution temperature and the second upper critical solution temperature are in a range of from 10° C. to 150° C.

5. The system of claim 4, wherein the first upper critical solution temperature and the second upper critical solution temperature are in a range of from 60° C. to 90° C.

6. A method comprising:
    flowing a carbon dioxide containing fluid through a membrane in an open position, the membrane encapsulating an adsorbent bed operating at a first temperature, wherein the adsorbent bed adsorbs at least a portion of the carbon dioxide of the carbon dioxide containing fluid;
adjusting the membrane to a closed position, thereby isolating the adsorbent bed and preventing fluid flow into and out of the membrane;
heating the adsorbent bed to a second temperature, thereby desorbing the carbon dioxide captured from the carbon dioxide containing fluid;
adjusting the membrane to the open position; and
cooling the adsorbent bed to the first temperature.

7. The method of claim 6, wherein:
the membrane comprises:
a porous base encapsulating the adsorbent bed;
a lattice structure surrounding and supported by the porous base, the lattice structure defining a plurality of void spaces; and
a plurality of hydrogel particles, each hydrogel particle disposed within a respective void space of the lattice structure, each hydrogel particle configured to be adjustable between:
an un-expanded form in which a maximum dimension of the hydrogel particle is smaller than a minimum dimension of the respective void space within which the hydrogel particle is disposed, thereby allowing fluid flow into and out of the membrane, and
an expanded form in which the maximum dimension of the hydrogel particle is increased, such that the hydrogel particle in the expanded form fills the respective void space within which the hydrogel particle is disposed, thereby preventing fluid flow into and out of the membrane;
adjusting the membrane to the closed position comprises adjusting the plurality of hydrogel particles to the expanded form; and
adjusting the membrane to the open position comprises adjusting the plurality of hydrogel particles to the un-expanded form.

8. The method of claim 7, wherein adjusting the plurality of hydrogel particles to the expanded form comprises flowing steam to the membrane.

9. The method of claim 8, wherein adjusting the membrane to the closed position comprises flowing steam to the membrane, thereby causing the membrane to reach a third temperature at which the plurality of hydrogel particles is adjusted to the expanded form, the third temperature intermediate of the first temperature and the second temperature, and continuing to flow steam to the membrane then causes the adsorbent bed to reach the second temperature at which the captured carbon dioxide is desorbed from the adsorbent bed while the membrane is in the closed position.

10. The method of claim 6, wherein:
the membrane comprises a thermo-responsive polymer;
the membrane defines a plurality of pores; and
a size of each of the pores is adjustable based on the thermo-responsive polymer responding to a change in temperature.

11. The method of claim 10, wherein adjusting the membrane to the closed position comprises heating the membrane to a third temperature at which the thermo-responsive polymer decreases the size of each of the pores, the third temperature intermediate of the first temperature and the second temperature.

12. The method of claim 11, wherein the third temperature is in a range of from 10 degrees Celsius (° C.) to 150° C.

13. The method of claim 12, wherein the third temperature is in a range of from 60° C. to 90° C.

14. The method of claim 11, wherein flowing the carbon dioxide containing fluid through the membrane in the open position, adjusting the membrane to the closed position, and heating the absorption bed to the second temperature proceed at atmospheric pressure.

15. The method of claim 14, wherein desorbing the carbon dioxide captured from the carbon dioxide containing fluid proceeds at an operating pressure in a range of from 0.1 millibar (mbar) to atmospheric pressure.

16. The method of claim 15, wherein desorbing the carbon dioxide captured from the carbon dioxide containing fluid proceeds at an operating pressure in a range of from 20 mbar to 500 mbar.

17. A system comprising:
a membrane comprising:
a porous base;
a lattice structure surrounding and supported by the porous base, the lattice structure defining a plurality of void spaces; and
a plurality of hydrogel particles, each hydrogel particle disposed within a respective void space of the lattice structure, each hydrogel particle configured to be adjustable between:
an un-expanded form in which a maximum dimension of the hydrogel particle is smaller than a minimum dimension of the respective void space within which the hydrogel particle is disposed, thereby allowing fluid flow into and out of the membrane, and
an expanded form in which the maximum dimension of the hydrogel particle is increased, such that the hydrogel particle in the expanded form fills the respective void space within which the hydrogel particle is disposed, thereby preventing fluid flow into and out of the membrane; and
an adsorbent bed encapsulated within the porous base of the membrane, wherein fluid communication between the adsorbent bed and an exterior of the membrane is controlled by the plurality of hydrogel particles, and the adsorbent bed is configured to:
adsorb at least a portion of carbon dioxide from a carbon dioxide containing fluid flowing through the membrane while the plurality of hydrogel particles is in the un-expanded form, such that fluid exiting the membrane has a decreased carbon dioxide content in comparison to the carbon dioxide containing fluid entering the membrane, and
in response to being heated, desorb the portion of carbon dioxide captured from the carbon dioxide containing fluid.

18. A system comprising:
a membrane comprising a stimulus-responsive polymer and defining a plurality of pores, a size of each of the pores is adjustable based on the stimulus-responsive polymer responding to a change in surrounding conditions, the stimulus-responsive polymer configured to:
in response to exposure to a stimulus, increase a size of each of the pores, thereby adjusting the membrane to an open position in which fluid flow into the membrane and fluid flow out of the membrane are allowed, the stimulus comprising at least one of a magnetic field, an electric field, or water vapor, and
in response to removing the stimulus, decrease the size of each of the pores, thereby adjusting the membrane to a closed position in which fluid flow into the membrane and fluid flow out of the membrane are prevented;

an adsorbent bed encapsulated within the membrane, wherein fluid communication between the adsorbent bed and an exterior of the membrane is controlled by the size of the pores, and the adsorbent bed is configured to:

adsorb at least a portion of carbon dioxide from a carbon dioxide containing fluid flowing through the membrane while the membrane is in the open position, such that the fluid exiting the membrane has a decreased carbon dioxide content in comparison to the fluid entering the membrane, and in response to being heated, desorb the portion of carbon dioxide captured from the carbon dioxide containing fluid; and a pressure change device configured to facilitate at least one of fluid flow into the membrane, fluid flow out of the membrane, or fluid flow through the membrane.

* * * * *